United States Patent
Ando et al.

(10) Patent No.: US 7,961,371 B2
(45) Date of Patent: Jun. 14, 2011

(54) OPTICAL BEAM GENERATING DEVICE

(75) Inventors: Taro Ando, Hamamatsu (JP); Yoshiyuki Ohtake, Hamamatsu (JP); Norihiro Fukuchi, Hamamatsu (JP); Naoya Matsumoto, Hamamatsu (JP); Haruyasu Ito, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 63 days.

(21) Appl. No.: 12/516,416

(22) PCT Filed: Sep. 14, 2007

(86) PCT No.: PCT/JP2007/067951
§ 371 (c)(1),
(2), (4) Date: May 27, 2009

(87) PCT Pub. No.: WO2008/065797
PCT Pub. Date: Jun. 5, 2008

(65) Prior Publication Data
US 2010/0060969 A1   Mar. 11, 2010

(30) Foreign Application Priority Data
Nov. 28, 2006   (JP) ................ 2006-320549

(51) Int. Cl.
*G02F 1/01* (2006.01)
(52) U.S. Cl. .................... 359/238; 359/246
(58) Field of Classification Search ............ 359/238
See application file for complete search history.

(56) References Cited

U.S. PATENT DOCUMENTS
5,333,000 A * 7/1994 Hietala et al. ............ 342/368
(Continued)

FOREIGN PATENT DOCUMENTS
JP      2001-523396      11/2001

OTHER PUBLICATIONS

Arlt et al., "The Production of Multiringed Laguerre-Gaussian Modes by Computer-Generated Holograms", Journal of Modern Optics, (1998), vol. 45, No. 6, pp. 1231-1237.

(Continued)

*Primary Examiner* — Jessica T Stultz
(74) *Attorney, Agent, or Firm* — Drinker Biddle & Reath LLP

(57) ABSTRACT

The light beam generator 1 is provided with a laser light source 10, an optical phase modulation element 15 and others. The optical phase modulation element 15 receives coherent light output from the laser light source 10 and passed through a beam splitter 14 to modulate a phase of the light depending on a position on the beam cross section of the light, and outputs the light after the phase modulation to the beam splitter 14. A polar coordinate system $(r, \theta)$ in which a predetermined position is given as an origin is set on the beam cross section of the light input in the optical phase modulation element 15, and when (p+1) domains divided by p (number of pieces) circumferences in which the predetermined position is given as a center are set, of these (p+1) domains, a phase modulation amount $\phi$ at each position inside an even numbered domain counted from the inside is expressed by a formula of "$\phi=q\theta$", and a phase modulation amount $\phi$ at each position inside an odd numbered domain counted from the inside is expressed by a formula of "$\phi=q\theta+\pi$".

2 Claims, 8 Drawing Sheets

U.S. PATENT DOCUMENTS

2003/0026199 A1* 2/2003 Myers .......................... 370/208
2010/0238455 A1* 9/2010 de Groot ....................... 356/512

OTHER PUBLICATIONS

David G. Grier, "A Revolution in Optical Manipulation", Nature, Aug. 14, 2003, vol. 424, pp. 810-816.

Beijersbergen et al., "Helical-wavefront Laser Beams Produced with a Spiral Phaseplate", Elsevier, Optics Communications vol. 112, (1994), pp. 321-327.

Sueda et al., "Laguerre-Gaussian Beam Generated with a Multilevel Spiral Phase Plate for High Intensity Laser Pulses", Optics Express, Jul. 26, 2004, vol. 12, No. 15, pp. 3548-3553.

Heckenberg et al., "Generation of Optical Phase Singularities by Computer-Generated Holograms", Optics Letters, Feb. 1, 1992, vol. 17, No. 3, pp. 221-223.

Heckenberg et al., "Laser Beams with Phase Singularities", Optical and Quantum Electronics, (1992), vol. 24, No. 9, pp. 155-166.

Arlt et al., "Atom Guiding Along Laguerre-Gaussian and Bessel Light Beams", Applied Physics B, (2000), vol. 71, pp. 549-554.

Yoko Miyamoto, Laguerre-Gaussian Beams and Optical Orbital Angular Momentum, The Review of Laser Engineering, vol. 32, No. 4, Apr. 15, 2004, pp. 232-236 (with English language translation, pp. 1-12).

Sueda et al., "Laguerre-Gaussian Beam Generated With a Multilevel Spiral Phase Plate for High Intensity Laser Pulses", Quantum Electronics and Laser Science Conference, (2005), pp. 1567-1569.

Heckenberg et al., "Generation of Optical Phase Singularities by Computer-Generated Holograms", Optics Letters, Feb. 1, 1992, vol. 17, No. 3, pp. 221-223.

Petrov et al., "A Simple Method to Generate Optical Beams With a Screw Phase Dislocation", Optics Communications No. 143 Nov. 15, 1997, pp. 265-267.

* cited by examiner (b) $p=1, q=1$ (a) $p=0, q=1$ (a)    (b)

OPTICAL BEAM GENERATING DEVICE

TECHNICAL FIELD

The present invention relates to a light beam generator which generates light having a predetermined phase distribution on a beam cross section of light.

BACKGROUND ART

Light beam generators for generating light having a predetermined phase distribution on a beam cross section of light described in Patent Document 1 and Non-Patent Documents 1 to 7 are known. Light beam generators described in these documents generate Laguerre-Gaussian Mode light (hereinafter referred to as "LG mode light") in which a phase changes along a circumferential direction on a beam cross section of light. This LG mode light is expected to be used for laser optical tweezers, quantum calculations and quantum communications, now a focus of attention in the fields of optics and physics.

[Patent Document 1] Japanese Translation of International Application No. 2001-523396
[Non-Patent Document 1] J. Arlt, et al., Journal of Modern Optics, Vol. 45, No. 6, pp. 1231-1237 (1998).
[Non-Patent Document 2] D. G Grier, Nature, Vol. 424, pp. 810-816 (2003).
[Non-Patent Document 3] M. W. Beijersbergen, et al., Optics Communications, Vol. 112, pp. 321-327 (1994).
[Non-Patent Document 4] K. Sueda, et al., Optics Express, Vol. 12, No. 15, pp. 3548-3553 (2004).
[Non-Patent Document 5] N. R. Heckenberg, et al., Optics Letters, Vol. 17, No. 3, pp. 221-223 (1992).
[Non-Patent Document 6] N. R. Heckenberg, et al., Optical and Quantum Electronics, Vol. 24, No. 24, pp. 155-166 (1992).
[Non-Patent Document 7] J. Arlt, T. Hitomi, K. Dholakia, Applied Physics, B, Vol. 71, pp. 549-554 (2000).

DISCLOSURE OF THE INVENTION

The above-described conventional light beam generators are functionally insufficient in making further applications of LG mode light. Specifically, the above described conventional methods are able to generate light having a higher-order declination exponent, of LG mode light. However, they are unable to generate, for example, higher-order radial exponent LG mode light preferable in transporting captured atoms systematically and in a sufficient quality from a practical standpoint. The present invention has been made in order to solve the above problem, an object of which is to provide a light beam generator capable of generating LG mode light which is expected for further applications.

Means for Solving the Problem

The light beam generator of the present invention is provided with (1) a light source of outputting coherent light and (2) an optical phase modulation element which receives light output from the light source to modulate a phase of the light depending on a position on the beam cross section of the light, and outputs the light after the phase modulation. Further, the light beam generator of the present invention is characterized in that a polar coordinate system (r, θ) having an origin at a predetermined position is set on a beam cross section of light input in the optical phase modulation element, and when (p+1) domains divided by p (number of pieces) circumferences in which the predetermined position is given as a center are set, of these (p+1) domains, a phase modulation amount φ at each position inside an even-numbered domain counted from the inside is expressed by a formula of "φ=qθ" and a phase modulation amount φ at each position inside an odd-numbered domain counted from the inside is expressed by a formula of "φ=qθ+π", however, provided that p is a natural number and q is an integer other than zero. Still further, the optical phase modulation element is preferably an element in which a phase modulation amount of each pixel is set on the basis of a control signal input from outside. It is noted that when n is given as an integer, an arbitrary phase α and a phase (α+2nπ) are equal in value to each other. Further, a distribution φ of phase adjustment amount may be set by disregarding an offset value but giving consideration only to a relative value. With the above description taken into account, a phase modulation amount φ in an optical phase modulation element can be limited to a range from a phase α to a phase (α+2π), or α may be a value of zero.

Effect of the Invention

The light beam generator of the present invention is able to generate higher-order LG mode light which is expected for further applications.

DESCRIPTION OF THE SYMBOLS

Figure 1:
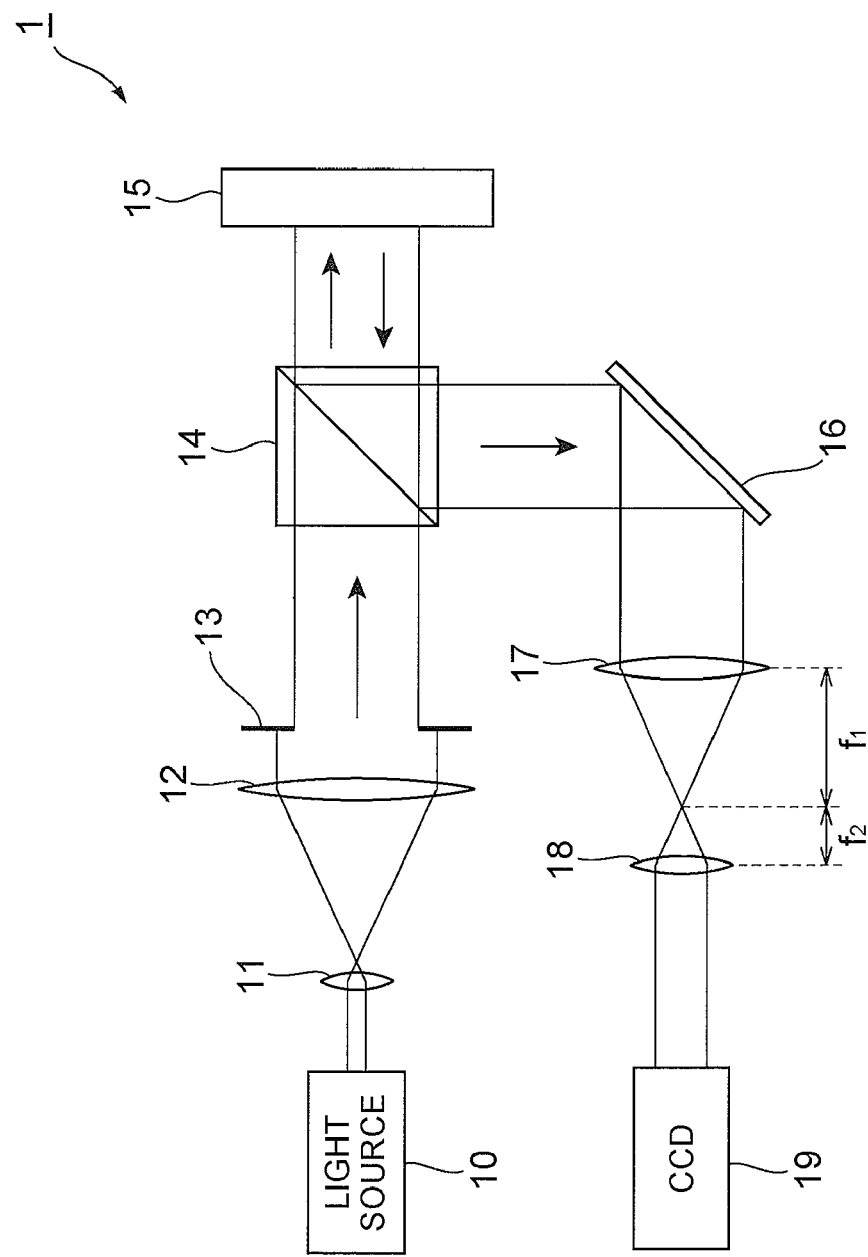
FIG. 1 is a block diagram showing a light beam generator 1 of the present embodiment.

1: light beam generator, 10: laser light source, 11, 12: convex lens, 13: aperture, 14: beam splitter, 15: optical phase modulation element, 16: mirror, 17, 18: convex lens, 19: CCD camera,

BEST MODE FOR CARRYING OUT THE INVENTION

Hereinafter, a detailed description will be given of the best mode for carrying out the present invention with reference to the attached drawings. It is noted that in the description of the drawings, the same reference numerals will be given to the same elements, with overlapping description omitted.

FIG. 1 is a block diagram showing the light beam generator 1 of the present embodiment. The light beam generator 1 shown in this drawing is provided with a laser light source 10, a convex lens 11, a convex lens 12, an aperture 13, a beam splitter 14, an optical phase modulation element 15, a mirror 16, a convex lens 17, a convex lens 18 and a CCD camera 19.

The laser light source 10 is to output coherent laser light, including, for example, a He—Ne laser light source. The lens 11 and the lens 12 which act as a beam expander receive light output from the laser light source 10 to expand a beam radius of the light, thereby outputting the light as parallel light. The aperture 13 has a round opening and receives the light output from the lens 11 and the lens 12, and outputs a part of the light passing through the opening at the beam cross section of the light. The beam splitter 14 allows a part of the light reached from the aperture 13 to transmit through and outputs to the optical phase modulation element 15 and also allows a part of the light reached from the optical phase modulation element 15 to reflect and outputs to the mirror 16.

The optical phase modulation element 15 receives the light output from the laser light source 10 and passed through the beam splitter 14 to modulate a phase of the light depending on a position on the beam cross section of the light, thereby outputting the light after the phase modulation to the beam splitter 14. The optical phase modulation element 15 may be an element which is given a thickness distribution by working the surface of a glass plate or the like, however, preferably an element (SLM: spatial light modulator) in which a phase modulation amount of each pixel is set on the basis of a control signal input from outside. Where an SLM is used as the optical phase modulation element 15, a spatial distribution of phase modulation amount can be written electrically to give various phase modulation distributions as appropriate.

The mirror 16 reflects light which has reached from the beam splitter 14 and outputs the thus reflected light to the lens 17. The lens 17 and the lens 18 receive light reflected by the mirror 16 to adjust a beam radius of the light, thereby outputting the light as parallel light. The CCD camera 19 receives light output from the lens 17 and the lens 18, thereby detecting an optical intensity distribution on the beam cross section of the light.

In the light beam generator 1, coherent laser light output from the laser light source 10 is expanded for the beam radius by the convex lens 11 and the convex lens 12, thereafter, a part of the beam cross section passes through the round opening of the aperture 13, by which the beam cross section is made round, and it transmits also through the beam splitter 14 and is input in the optical phase modulation element 15. The light input in the optical phase modulation element 15 is subjected to phase modulation by the optical phase modulation element 15 depending on a position on the beam cross section and reflected.

The light which is subjected to phase modulation by the optical phase modulation element 15 and reflected is reflected by the beam splitter 14 and further reflected by the mirror 16, adjusted for the beam radius by the convex lens 17 and the convex lens 18, and made incident on a light receiving face of the CCD camera 19, thereby the optical intensity distribution on the beam cross section of the light is detected by the CCD camera 19.

Hereinafter, a more detailed description will be given for the phase modulation amount given to light in the optical phase modulation element 15. A polar coordinate system (r, θ) in which a predetermined position (center position on a round beam cross section) is given as an origin is set on a beam cross section of light to be input in the optical phase modulation element 15, and also (p+1) (number of pieces) domains $A_0$ to $A_p$ divided by each of circumferences having p radiuses $r_1$ to $r_p$ in which the predetermined position is given as a center are set. They are to be domains $A_0, A_1, A_2, \ldots, A_p$ sequentially from the inside. The domain $A_0$ is a domain inside a circumference of the radius $r_1$ and the domain $A_i$ is a domain between a circumference of radius $r_{i-1}$ and that of the radius $r_i$ (i=1, 2, 3, ..., p).

In this instance, as shown in the formula (1) given below, a phase modulation amount φ at each position inside the respective domains of even numbered domains $A_0, A_2, A_4, \ldots$ can be expressed by the formula, "φ=qθ". Further, a phase modulation amount φ at each position inside the respective domains of odd numbered domains $A_1, A_3, A_5, \ldots$ can be expressed by the formula, "φ=qθ+π", however, provided that p is called a radial exponent and a natural number, while q is called a declination exponent and an integer other than zero.

[Mathematical formula 1]

$$\phi(r, \theta) = \begin{cases} q\theta & (\text{Domains } A_0, A_2, A_4, \ldots) \\ q\theta + \pi & (\text{Domains } A_1, A_3, A_5, \ldots) \end{cases} \quad (1)$$

When n is given as an integer, an arbitrary phase α and an arbitrary phase (α+2nπ) are equal in value to each other. And a distribution φ (r, θ) of the phase adjustment amount may be set by disregarding an offset value but giving consideration only to a relative value. With the above description taken into account, a phase modulation amount φ expressed by the above formula (1) can be limited to a range from a phase α to a phase (α+2π). It is noted that α is an arbitrary value and preferably a value of zero in terms of the mathematical expression.

A phase discontinuity line expressed by circumferences of p (number of pieces) radiuses $r_1$ to $r_p$ to be set in a radial direction r can be set as follows. The phase discontinuity line is present at a part ("segment") at which an optical intensity is zero. In the case of LG mode, a segment of the optical intensity distribution can be determined by the zero point of Sonine polynomials. Specifically, determined is a value of a variable z in which Sonine polynomials $S_p^q(z)$ defined by the formula (2) given below is a value of zero. The Sonine polynomials $S_p^q(z)$ are $p^{th}$ polynomials having p (number of pieces) different positive real number roots $a_1$ to $a_p$. These roots $a_i$ and a parameter w specifying a radius of light beam are used to express radius $r_i$ of the phase discontinuity line by the formula (3) given below (i=1, 2, 3, ..., p).

[Mathematical formula 2]

$$S_p^q(z) = \sum_{k=0}^{p} \frac{(-1)^k \cdot (p + |q|)}{(p-k)! \cdot (|q|+k) \cdot k!} \cdot z^k \quad (2)$$

[Mathematical formula 3]

$$r_i = w\sqrt{\frac{a_i}{2}} \quad (i = 1, 2, \ldots, p) \quad (3)$$

Light subjected to the above-described phase modulation φ (r, θ) by the optical phase modulation element 15 and reflected is changed into LG mode light in which a radial exponent is p and a declination exponent is q. As apparent from the above formula (1), in the LG mode light having the declination exponent q, if the declination exponent q is a positive value, while the declination variable θ changes from a value zero to a value 2π, the phase value repeats the change of the value zero to the value 2πq times. In the LG mode light having the declination exponent q, if the declination exponent q is a negative value, while the declination variable θ changes from a value zero to a value 2π, the phase value repeats the change of the value 2π to the value zero −q times. Further, in the LG mode light having the radial exponent p, when the declination variable θ is fixed, a phase value at a point belonging to two domains in contact with the phase discontinuity line as a border line has a difference of π.

Figure 2:
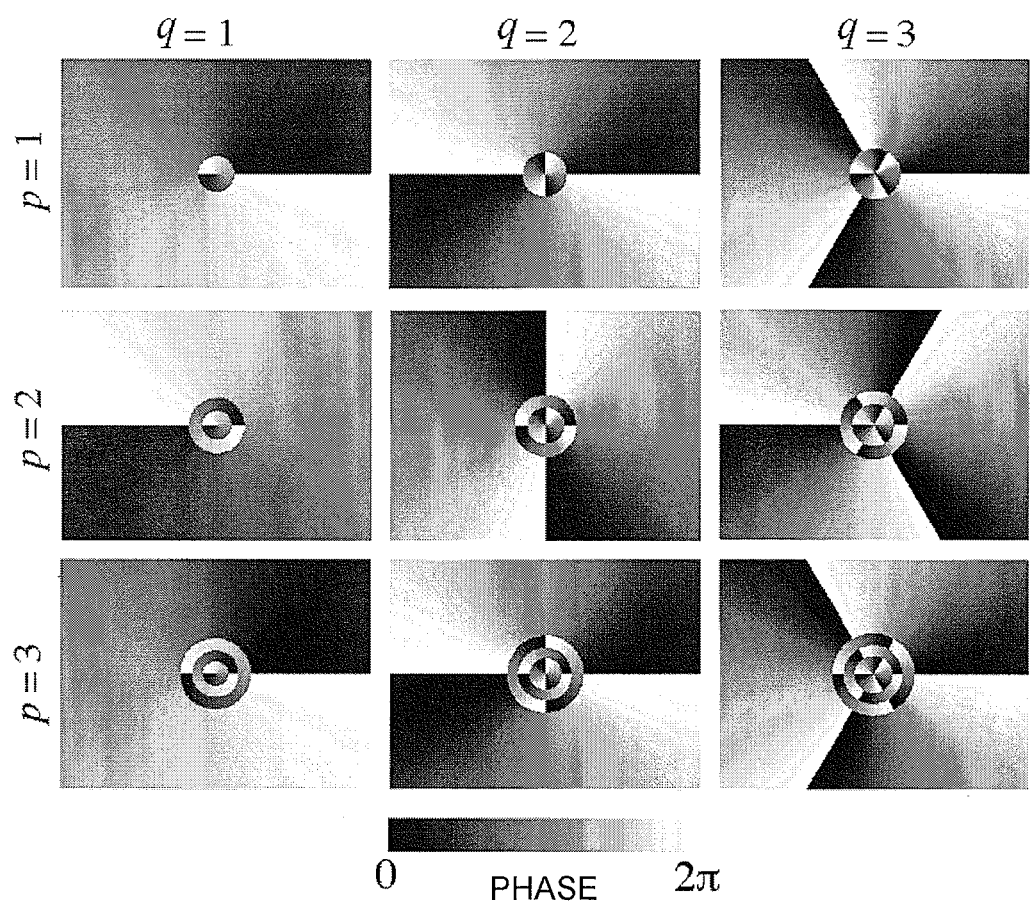
FIG. 2 is a view showing an example of a distribution of phase modulation amount in an optical phase modulation element 15.
Figure 3:
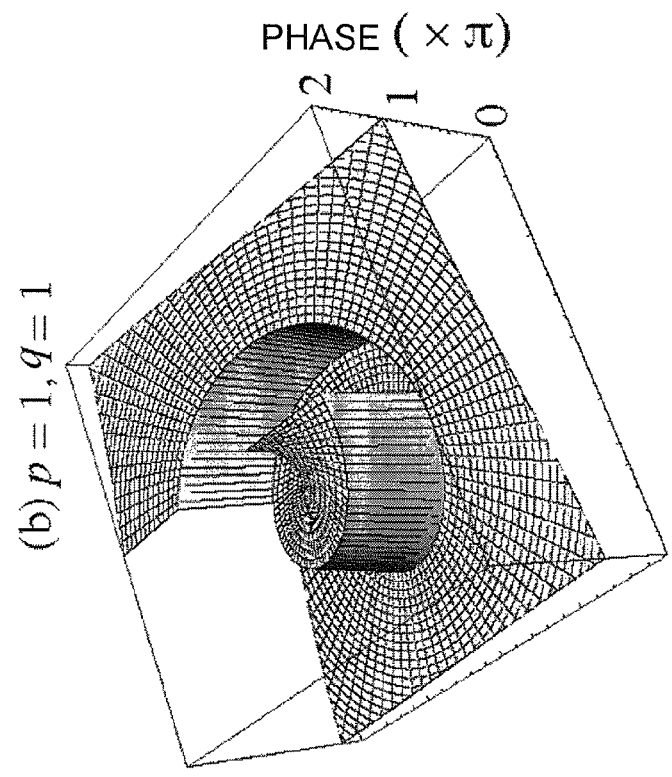
FIG. 3 is a view showing an example of a distribution of phase modulation amount in the optical phase modulation element 15.
Figure 3:
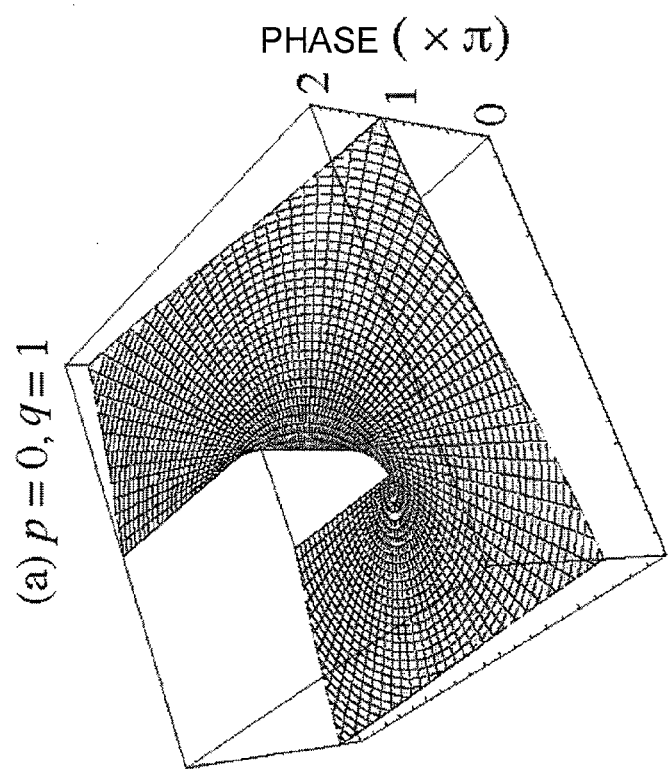
Figure 4:
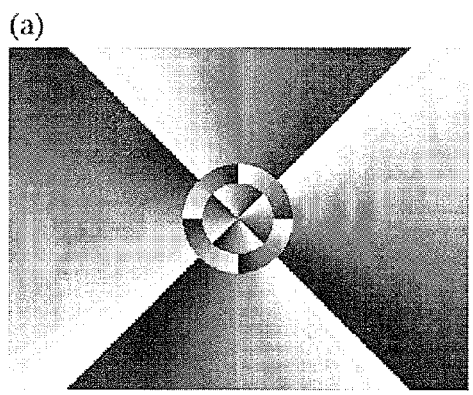
FIG. 4 is a view showing an example of a distribution of phase modulation amount in the optical phase modulation element 15.
Figure 4:
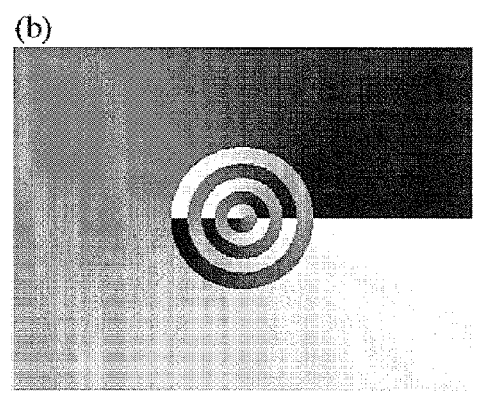

FIG. 2 to FIG. 4 are drawings respectively showing examples of distributions of phase modulation amount in the optical phase modulation element 15. In FIG. 2, the radial exponent p and the declination exponent q are respectively given as each value of 1 to 3 and a distribution of phase modulation amount in the optical phase modulation element 15 is shown by making contrasting densities different. FIG. 3 shows in a three-dimensional manner a distribution of phase modulation amount in the optical phase modulation element 15, in which the phase adjustment amount in the optical phase modulation element 15 is given on the z axis. FIG. 3 (a) shows a distribution of phase adjustment amount in the optical phase modulation element 15 where the radial exponent p is zero and the declination exponent q is one. FIG. 3 (b) shows a distribution of phase adjustment amount in the optical phase modulation element 15 where the radial exponent p is one and the declination exponent q is one. FIG. 4 (a) shows a distribution of phase adjustment amount in the optical phase modulation element 15 by making contrasting densities different where the radial exponent p is two and the declination exponent q is four. Further, FIG. 4 (b) shows a distribution of phase adjustment amount in the optical phase modulation element 15 by making contrasting densities different where the radial exponent p is five and the declination exponent q is one.

Figure 5:
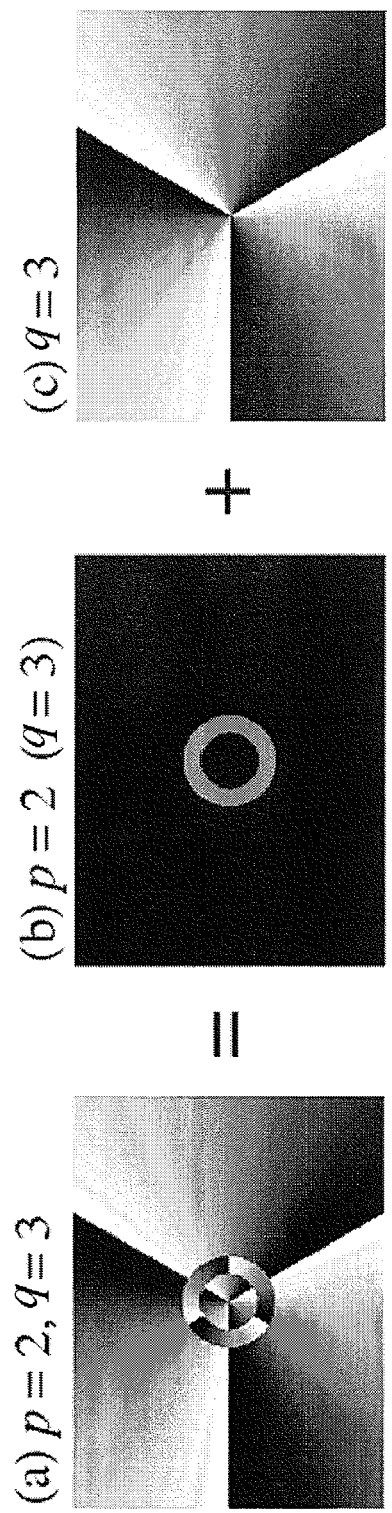
FIG. 5 is a view showing examples of the respective distributions of phase modulation amount in two optical phase modulation elements.

Phase modulation in the declination direction and phase modulation in the radial direction may be given by one optical phase modulation element or may be given individually by two optical phase modulation elements. FIG. 5 is a view showing an example of the latter or the respective distributions of phase modulation amount in two optical phase modulation elements. FIG. 5 (a) shows a distribution of phase adjustment amount by making contrasting densities different where the radial exponent p is two and the declination exponent q is three. FIG. 5 (b) shows a distribution of phase adjustment amount in a first optical phase modulation element where the radial exponent p is two. FIG. 5 (c) shows a distribution of phase adjustment amount in a second optical phase modulation element by making contrasting densities different where the radial exponent p is zero and the declination exponent q is three. It is noted that the distribution of phase modulation amount shown in FIG. 5 (b) is that given by the above formulae (2) and (3), therefore depending on the declination exponent q as well. The distribution of phase adjustment amount shown in FIG. 5 (a) is expressed as a sum of the respective distributions of phase adjustment amount shown in FIG. 5 (b) and FIG. 5 (c). The phase distribution may be given first in the radial direction and then in the declination direction or vice versa.

Figure 6:
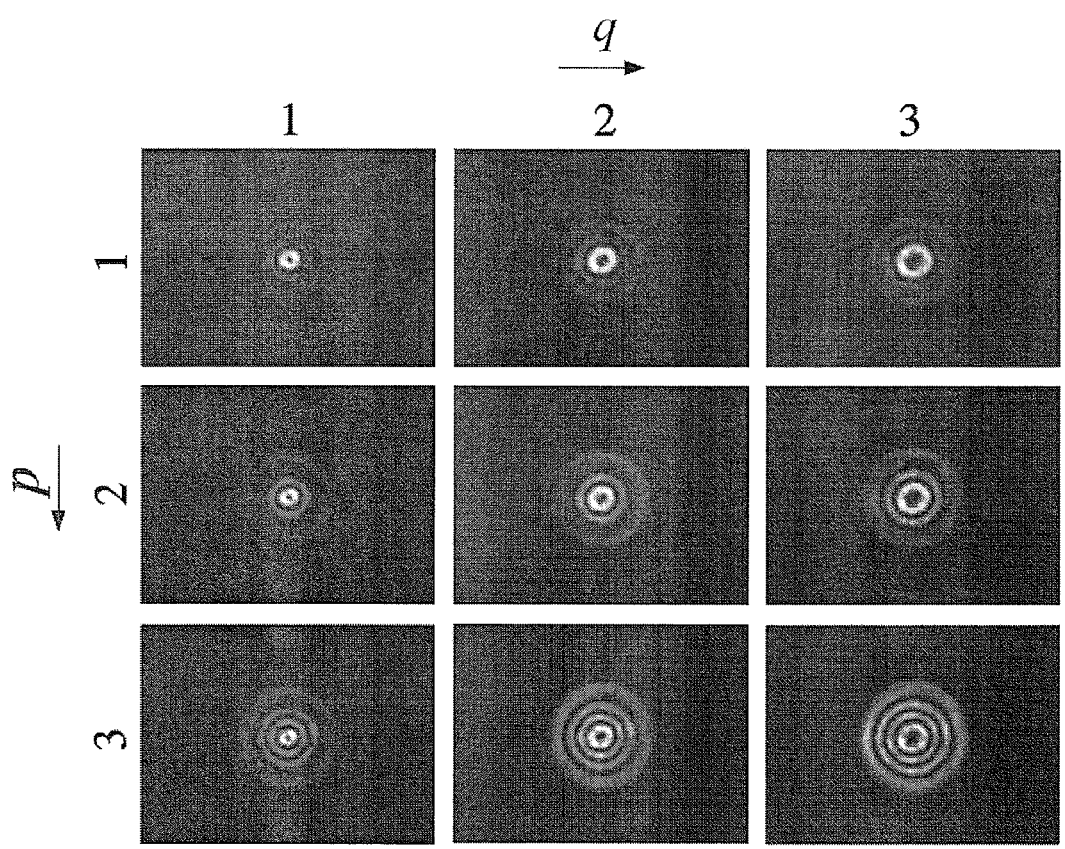
FIG. 6 is a view showing an example of an intensity distribution (observed values) on a beam cross section of LG mode light output from the light beam generator 1 of the present embodiment.
Figure 7:
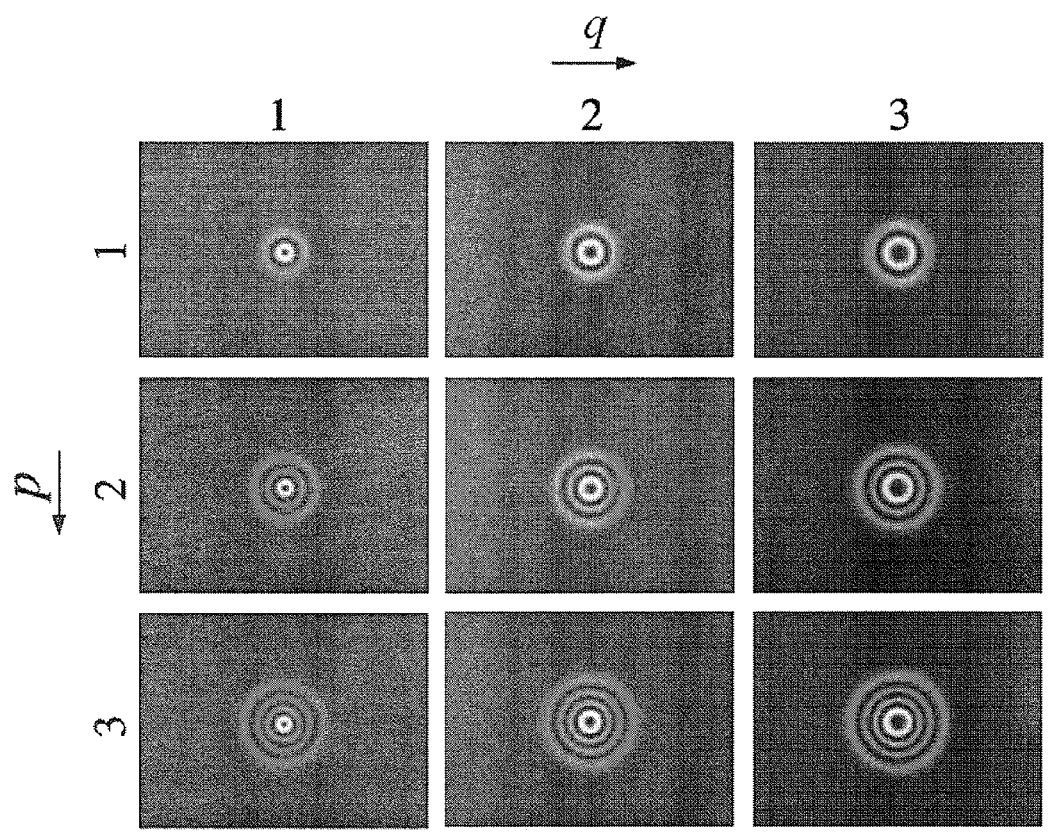
FIG. 7 is a view showing an example of an intensity distribution (theoretical values) on the beam cross section of LG mode light output from the light beam generator 1 of the present embodiment.

FIG. 6 and FIG. 7 are drawings respectively showing examples of intensity distributions on a beam cross section of LG mode light output from the light beam generator 1 of the present embodiment. FIG. 6 shows observed values, while FIG. 7 shows theoretical values. The radial exponent p and the declination exponent q are respectively given as each value of 1 to 3. These exponents correspond to the distribution of phase modulation amount in the optical phase modulation element 15 shown in FIG. 2. As apparent from the above-described drawings, the observed values (FIG. 6) and the theoretical values (FIG. 7) correspond well to each other in any mode and the thus obtained light is LG mode light.

Figure 8:
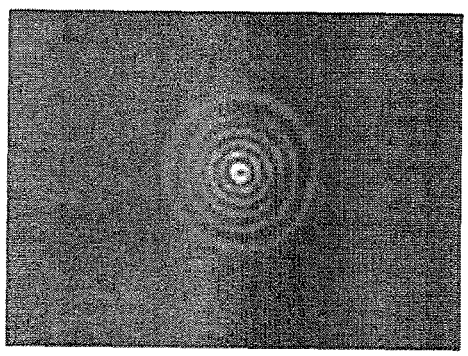
FIG. 8 is an example of an intensity distribution on the beam cross section of LG mode light output from the light beam generator 1 of the present embodiment.
Figure 8:
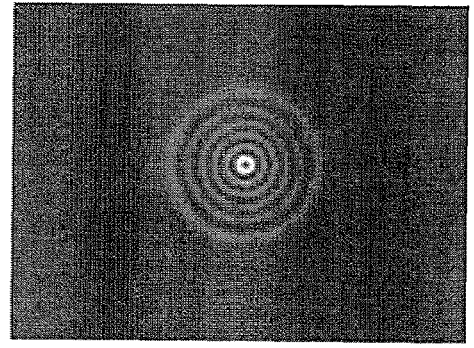

FIG. 8 is a view showing an example of an intensity distribution on the beam cross section of LG mode light output from the light beam generator 1 of the present embodiment. FIG. 8 (a) shows observed values, while FIG. 8 (b) shows theoretical values. The radial exponent p is five and the declination exponent q is one, which corresponds to the distribution of phase modulation amount in the optical phase modulation element 15 shown in FIG. 4 (b). As apparent from these drawings, the thus described higher-order LG mode light can be generated highly accurately and in high definition.

As described above, the light beam generator 1 of the present embodiment is able to generate at high accuracy and in high definition the LG mode light which is high order both in terms of radial exponents and declination exponents. And further applications are expected by using the higher-order LG mode light.

It is noted that in the above embodiments, the optical phase modulation element 15 is of a reflection type. However, a transmission type optical phase modulation element may be used in the present invention.

INDUSTRIAL APPLICABILITY

The present invention is to provide a light beam generator capable of generating LG mode light for which further applications are expected.

The invention claimed is:

1. A light beam generator including:
a light source for outputting coherent light; and
an optical phase modulation element which receives the light output from the light source to modulate a phase of the light depending on a position on a beam cross section of the light, and outputs the light after the phase modulation; wherein
a polar coordinate system (r, θ) having an origin at a beam center position is set on the beam cross section of the light input in the optical phase modulation element, and when domains $A_0$ to $A_p$ are defined on the beam cross section and centers of the domains $A_0$ to $A_p$ are placed commonly at the beam center position, on these domains $A_0$ to $A_p$, a phase modulation amount Φ at each position inside an even-numbered domain counted from the beam center is expressed by a formula of Φ=qθ and a phase modulation amount Φ at each position inside an odd-numbered domain counted from the beam center is expressed by a formula of Φ=qθ+π, provided that p is a natural number corresponding to a radial exponent and q is a non-zero integer number corresponding to a declination component.

2. The light beam generator according to claim 1, wherein the optical phase modulation element is an element in which a phase modulation amount of each pixel is set on the basis of a control signal input from outside.

* * * * *